(12) United States Patent
Lin

(10) Patent No.: US 10,760,604 B2
(45) Date of Patent: Sep. 1, 2020

(54) TELESCOPIC MODULE

(71) Applicants: Yi-Chen Tseng, Taichung (TW); HI-MAX INNOVATION CO., LTD., Taichung (TW)

(72) Inventor: Jhih-Fan Lin, Taichung (TW)

(73) Assignees: Yi-Chen Tseng, Taichung (TW); Hi-Max Innovation Co., Ltd., Taichung (TW)

( * ) Notice: Subject to any disclaimer, the term of this patent is extended or adjusted under 35 U.S.C. 154(b) by 558 days.

(21) Appl. No.: 15/664,598

(22) Filed: Jul. 31, 2017

(65) Prior Publication Data

US 2019/0032691 A1    Jan. 31, 2019

(51) Int. Cl.
*A47B 9/20* (2006.01)
*F16B 7/14* (2006.01)

(52) U.S. Cl.
CPC .............. *F16B 7/1436* (2013.01); *A47B 9/20* (2013.01); *A47B 2200/0052* (2013.01); *Y10T 403/32516* (2015.01)

(58) Field of Classification Search
CPC .............. A47B 9/20; A47B 2200/0052; A47B 2200/0053; F16B 7/1409; F16B 7/1436; Y10T 403/32467; Y10T 403/32516

USPC ........................................... 403/109.1, 109.7
See application file for complete search history.

(56) References Cited

U.S. PATENT DOCUMENTS

| | | | | |
|---|---|---|---|---|
| 4,601,246 A | * | 7/1986 | Damico | F16B 7/1409 108/146 |
| 6,250,839 B1 | * | 6/2001 | Lenhart | A63C 11/221 403/109.1 |
| 7,424,833 B2 | * | 9/2008 | Fich | F16B 7/1436 108/147.19 |
| 8,876,662 B2 | * | 11/2014 | Hao | A47B 9/20 482/4 |
| 9,578,936 B1 | * | 2/2017 | Li | F16B 7/1409 |

FOREIGN PATENT DOCUMENTS

GB           1068407 A * 5/1967 ............... A47B 9/20

* cited by examiner

*Primary Examiner* — Josh Skroupa
(74) *Attorney, Agent, or Firm* — Wang Law Firm, Inc.

(57) ABSTRACT

A telescopic module includes a first tube having a passageway therein; a second tube received in the passageway of the first tube for reciprocation; a hub connected to the second tube; a roller pivoted on the hub to touch the inner side of the first tube; and an adjusting member. The hub is provided with an expanding hole and flexible portions. The roller is pivoted on the flexible portion, and the adjusting member is inserted into the expanding hole and abuts against the flexible portions to move the roller outwardly.

7 Claims, 12 Drawing Sheets

TELESCOPIC MODULE

BACKGROUND OF THE INVENTION

1. Technical Field

The present invention relates to a desk or a chair, and more particularly to a telescopic module of a desk or a chair for elevating and lowering a worksurface.

2. Description of Related Art

Typically, a conventional desk has a consistent height of a worksurface, and a user may sit on a chair to read, write, or operate a computer on the desk. However, heights of people are different, so that the desk and chair with a consistent height can't meet all heights of the users.

An improved desk has a telescopic stand to adjust its height. The conventional telescopic stand has an inner tube and an outer tube to elevate or lower the worksurface by moving the inner tube, and fix the inner tube to the outer tube when the telescopic stand is adjusted to a desired length. The same structure of the telescopic stand may be incorporated in a chair.

It is easy to understand that a friction is occurred between the inner tube and the outer tube when the telescopic stand is telescoped. In order to reduce the friction, a ring is provided between the inner tube and the outer tube. Typically, the ring is fixed to the outer tube, so there still is a relative motion between the ring and the inner tube. It may wear the ring, and make it lose the function of reducing the friction. The worn ring causes an unstable telescoping motion of the telescopic stand as well.

An improved telescopic stand is provided with ribs on an inner side of the outer tube or an outer side of the inner tube instead of the ring. The ribs may reduce the friction between the inner tube and the outer tube. However, the inner tube and the outer tube still will be worn after a long time of operation.

BRIEF SUMMARY OF THE INVENTION

In view of the above, the primary objective of the present invention is to provide a telescopic module, which has a small friction and a stable movement when the telescopic module is elevated or lowered.

The secondary objective of the present invention is to provide a telescopic module, which may reduce the wear of the elements of the telescopic module.

In order to achieve the objective of the present invention, a telescopic module includes a first tube, second tube, and a roller between the first and the second tube. The first tube has a passageway, in which the second tube is received for reciprocation. The roller touches at least one of an inner side of the first tube and an outer side of the second tube to be turned when the second tube is moving.

The roller may reduce the friction between the first and the second tubes when the second tube is moving.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
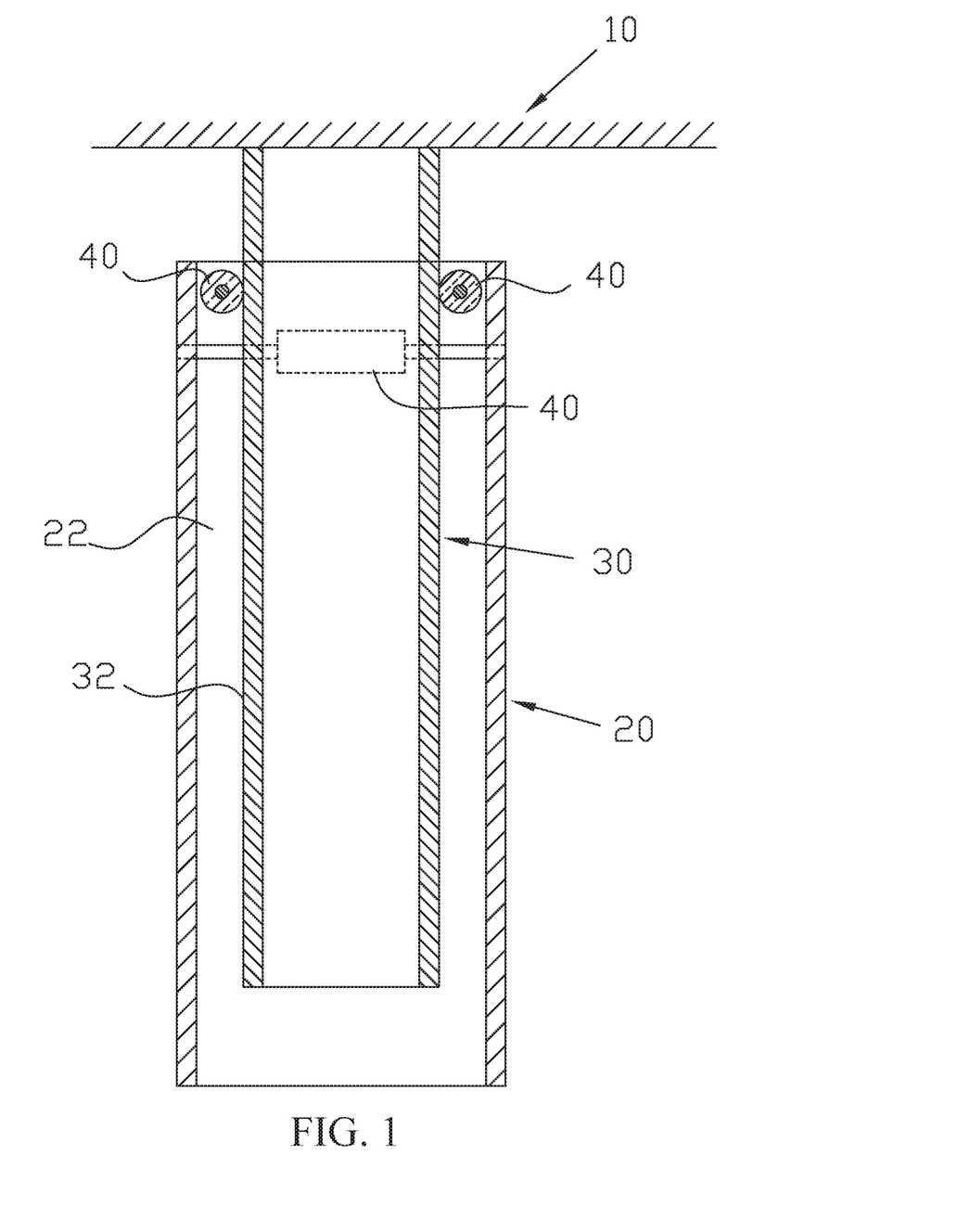
FIG. 1 is a sectional view of a first preferred embodiment of the present invention.
Figure 2:
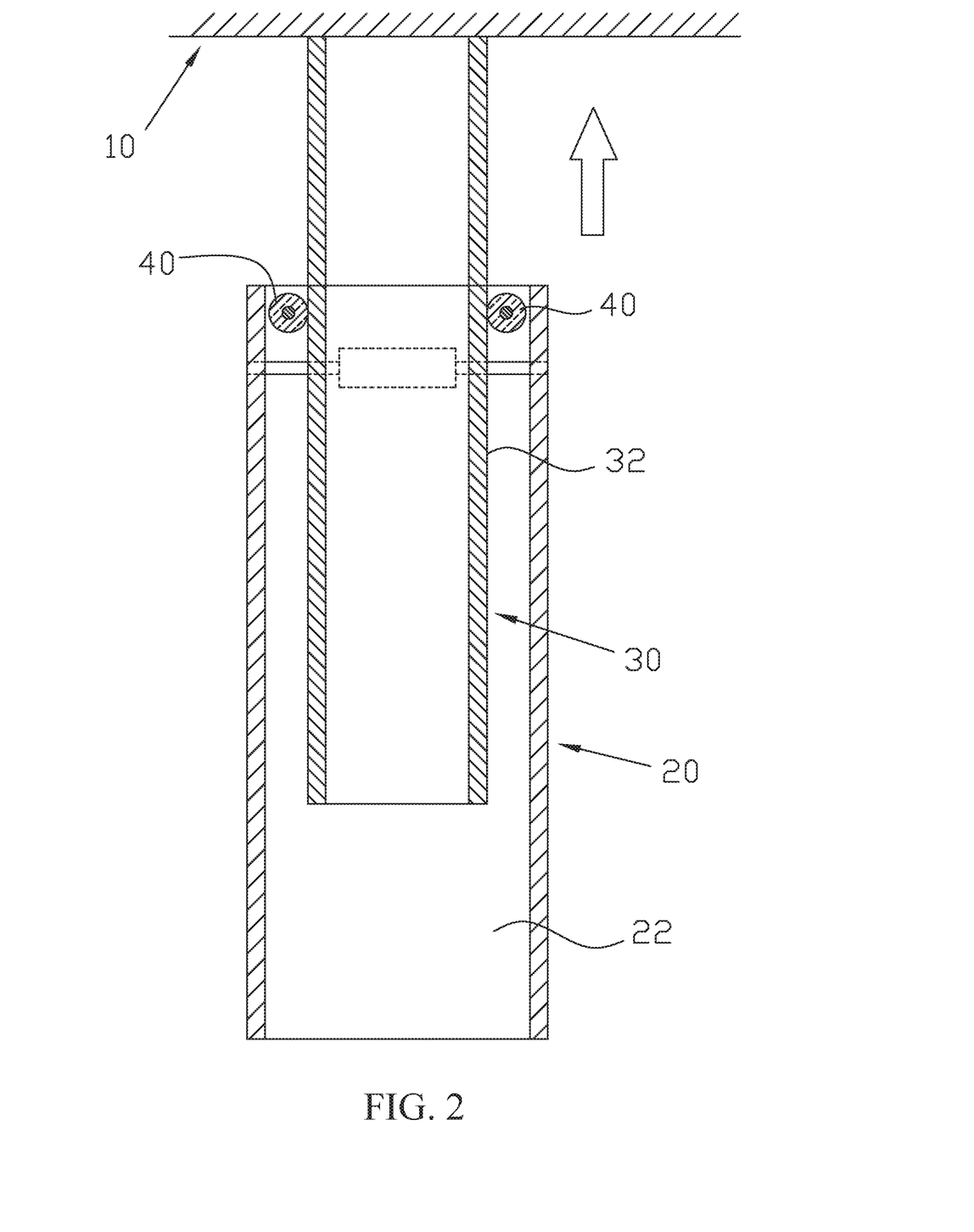
FIG. 2 is a sectional view of the first preferred embodiment of the present invention, showing the telescopic module telescoping.

FIG. 1 and FIG. 2 show a telescopic module of the first preferred embodiment of the present invention, which is connected to a worksurface 10 to adjust a height of the worksurface 10. The telescopic module may be incorporated into a desk, a chair, or any other devices which is able to elevate and lower the worksurface 10. It is noted that usually there are a plurality of the telescopic modules are incorporated.

The telescopic module of the first preferred embodiment of the present invention includes a first tube 20 and a second tube 30. The first tube 20 has a passageway 22, in which the second tube 30 is received for free reciprocation. A plurality of rollers 40 are pivoted on the first tube 20 and touch the second tube 30.

The first and the second tubes 20, 30 are rectangular tubes. Four of the rollers 40 are pivoted on four sides of the first tube 20 to touch four outer sides 32 of the second tube 30.

The second tube 30 is moved relative to the first tube 20 to adjust the height of the worksurface 10, and the rollers 40 may reduce a friction when the second tube 30 is moving and provide the second tube 30 with a stable movement.

Figure 3:
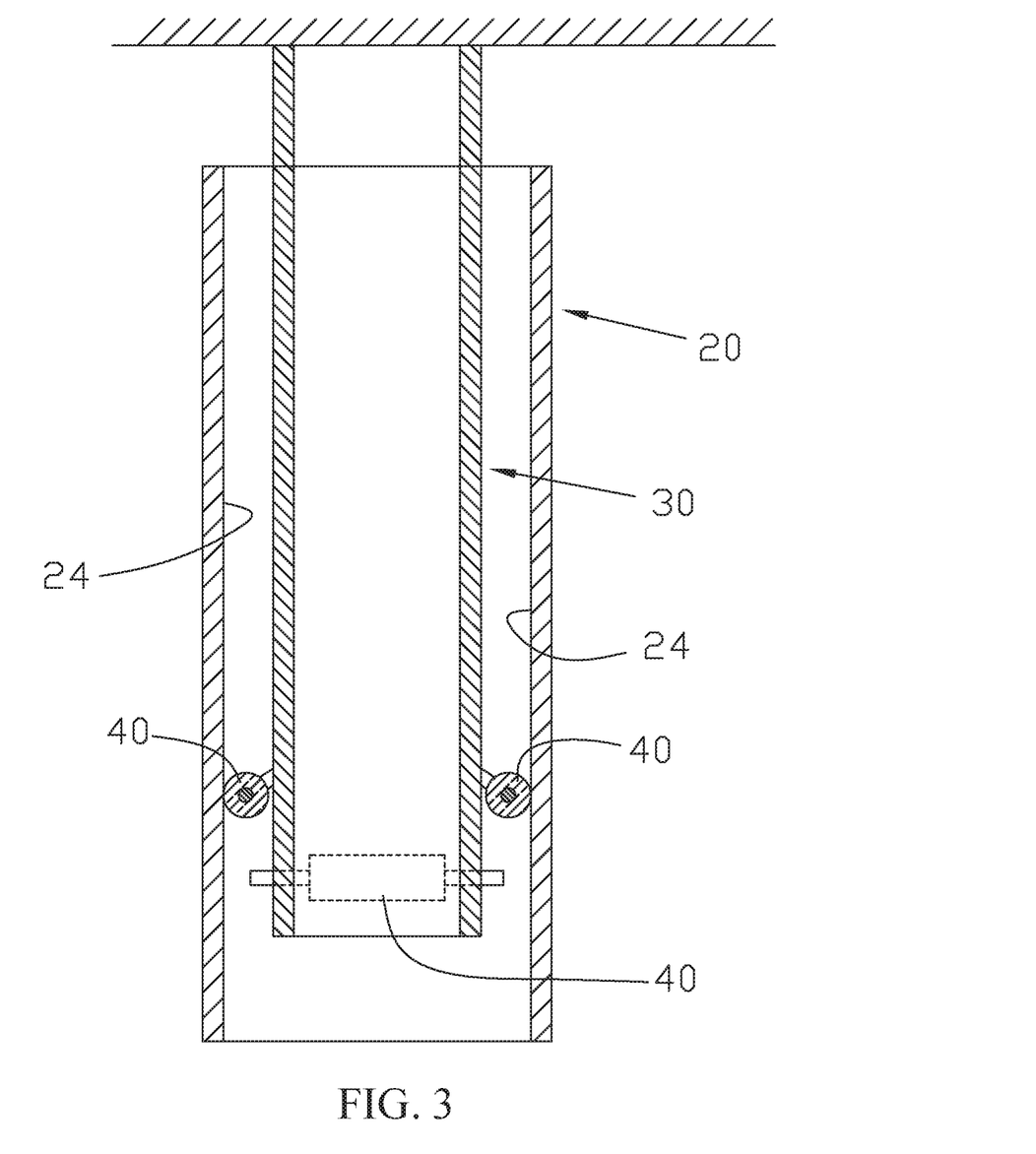
FIG. 3 is a sectional view of a second preferred embodiment of the present invention, showing the first leg member be lowered.
Figure 4:
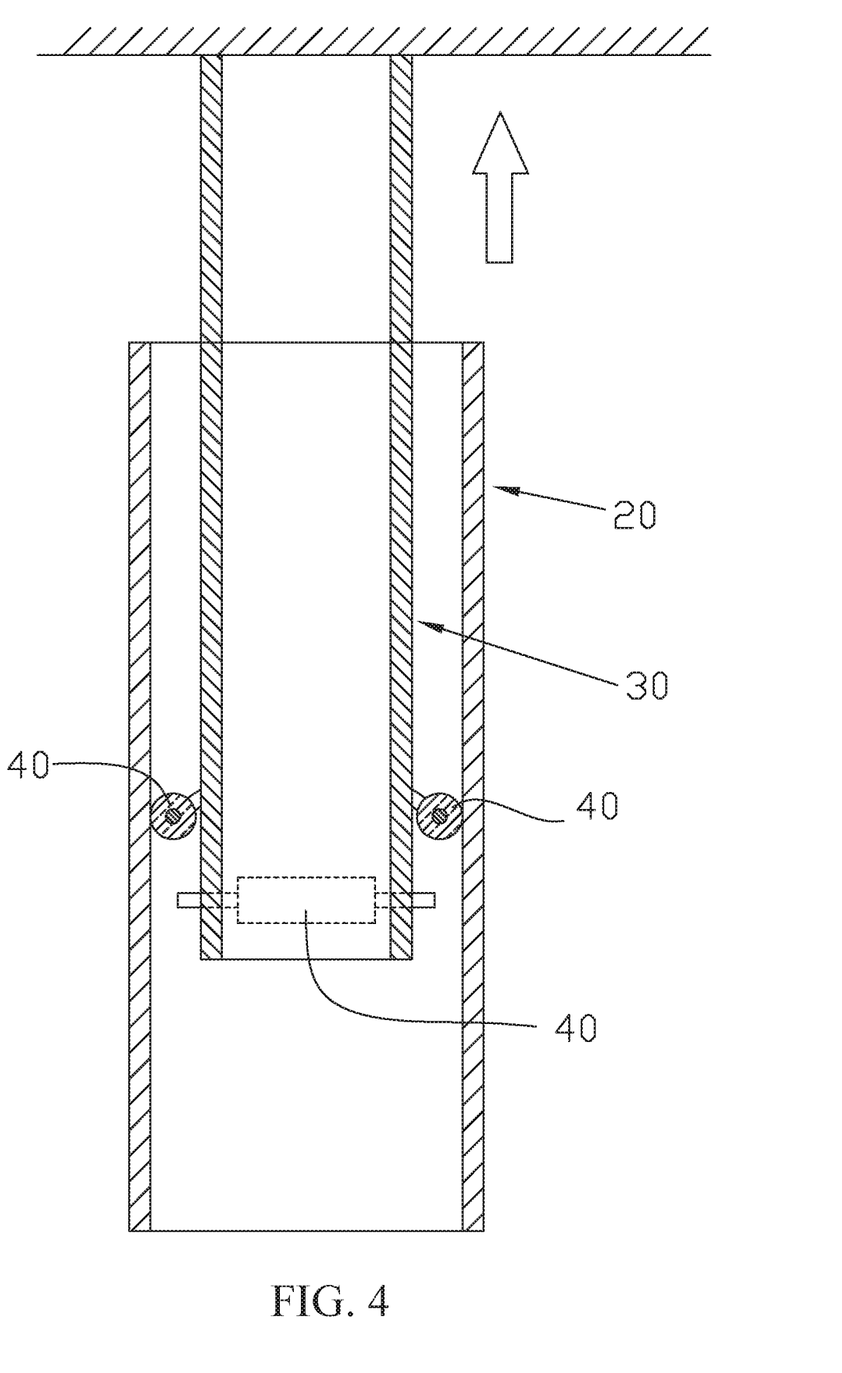
FIG. 4 is a sectional view of the second preferred embodiment of the present invention, showing the telescopic module telescoping.

As shown in FIG. 3 and FIG. 4, the second preferred embodiment of the present invention provides four rollers 40 on the second tube 30 to touch four inner sides 24 of the first tube 20.

The second preferred provides the same function of reduction of friction and wear of the tubes when the second tube 30 is moving.

Figure 5:
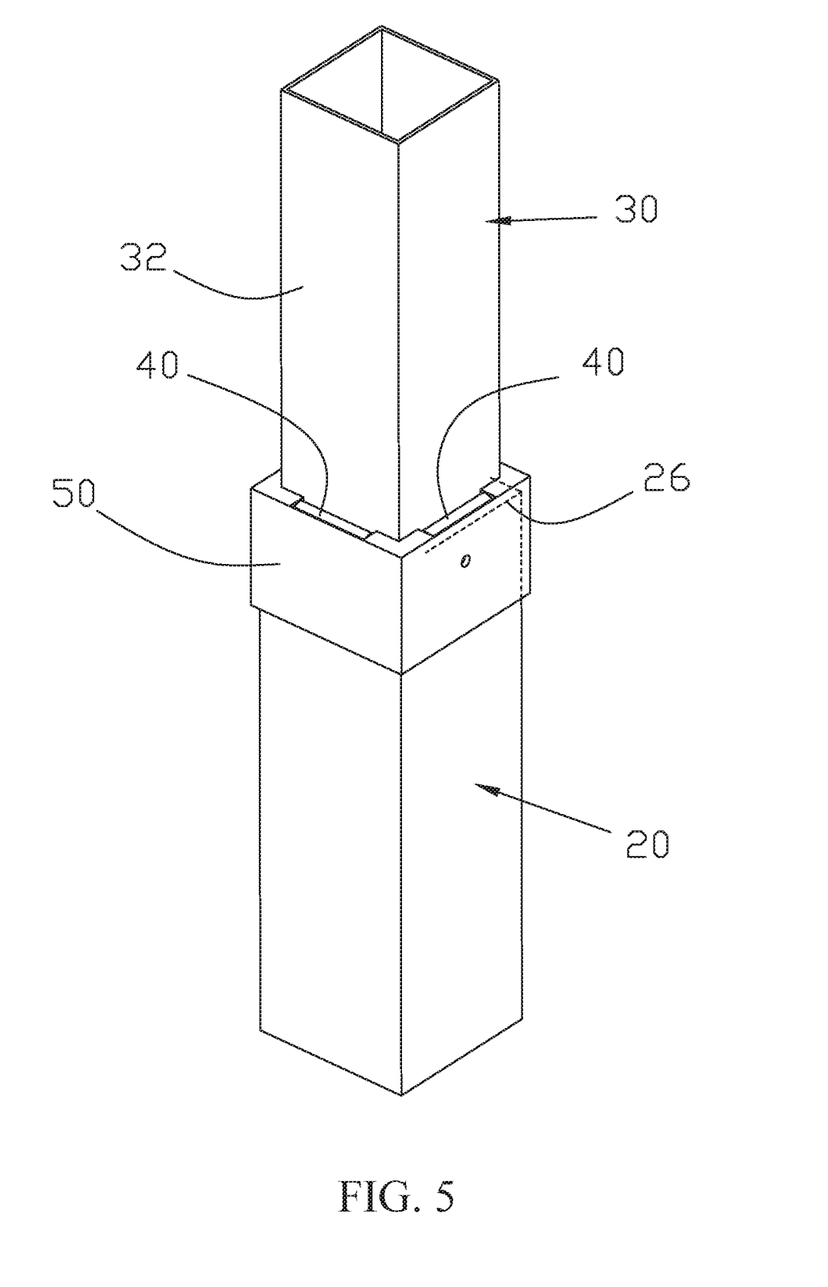
FIG. 5 is a perspective view of a third preferred embodiment of the present invention.
Figure 6:
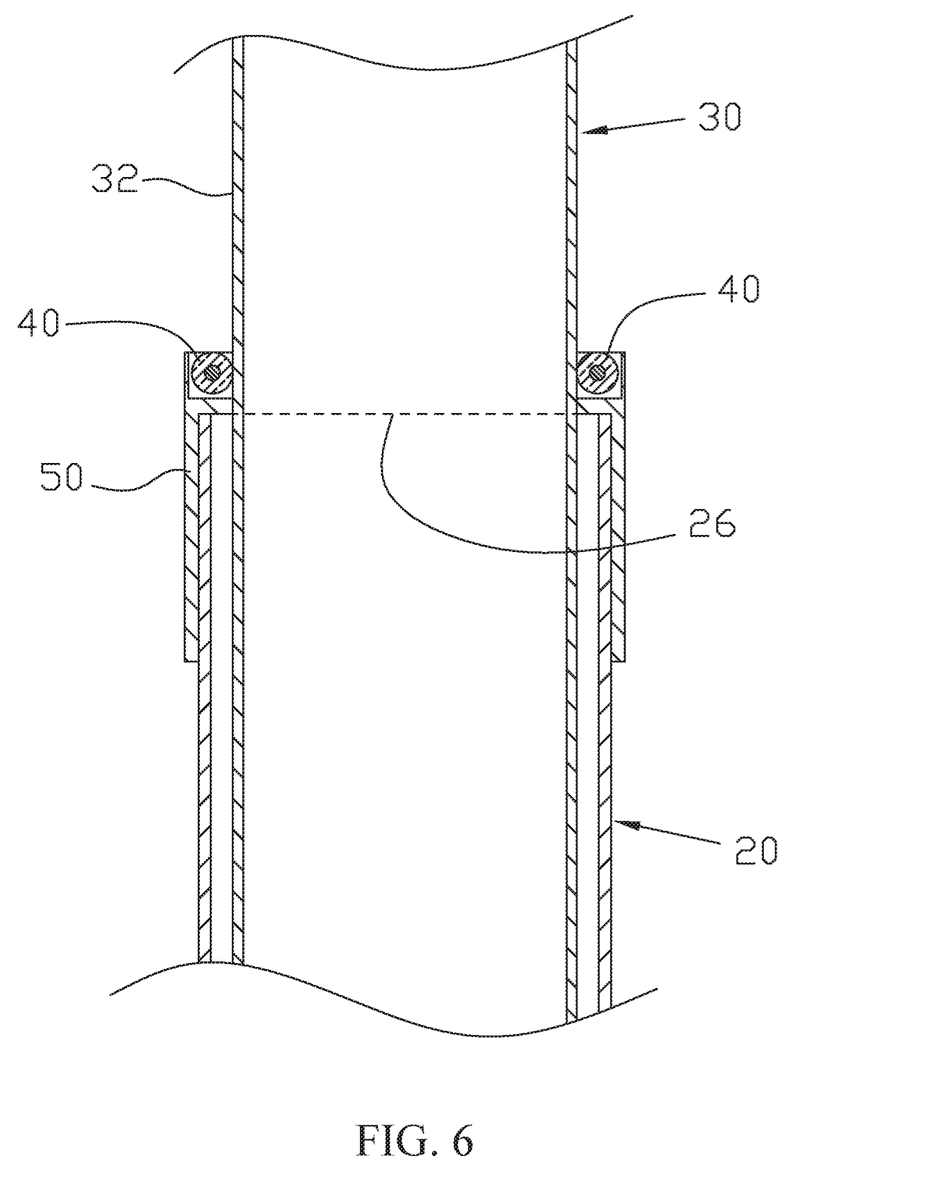
FIG. 6 is a partial sectional view of the third preferred embodiment of the present invention.

As shown in FIG. 5 and FIG. 6, a telescopic module of the third preferred embodiment of the present invention further provides a hub 50 on an end 26 of the first tube 20, and the rollers 40 are pivoted on an inner side of the hub 50 to touch the second tube 30, which is inserted into both the hub 50 and the first tube 20. The function of the third preferred embodiment are the same as above, including reduction of friction and wear, and providing the second tube 30 a stable movement.

Figure 7:
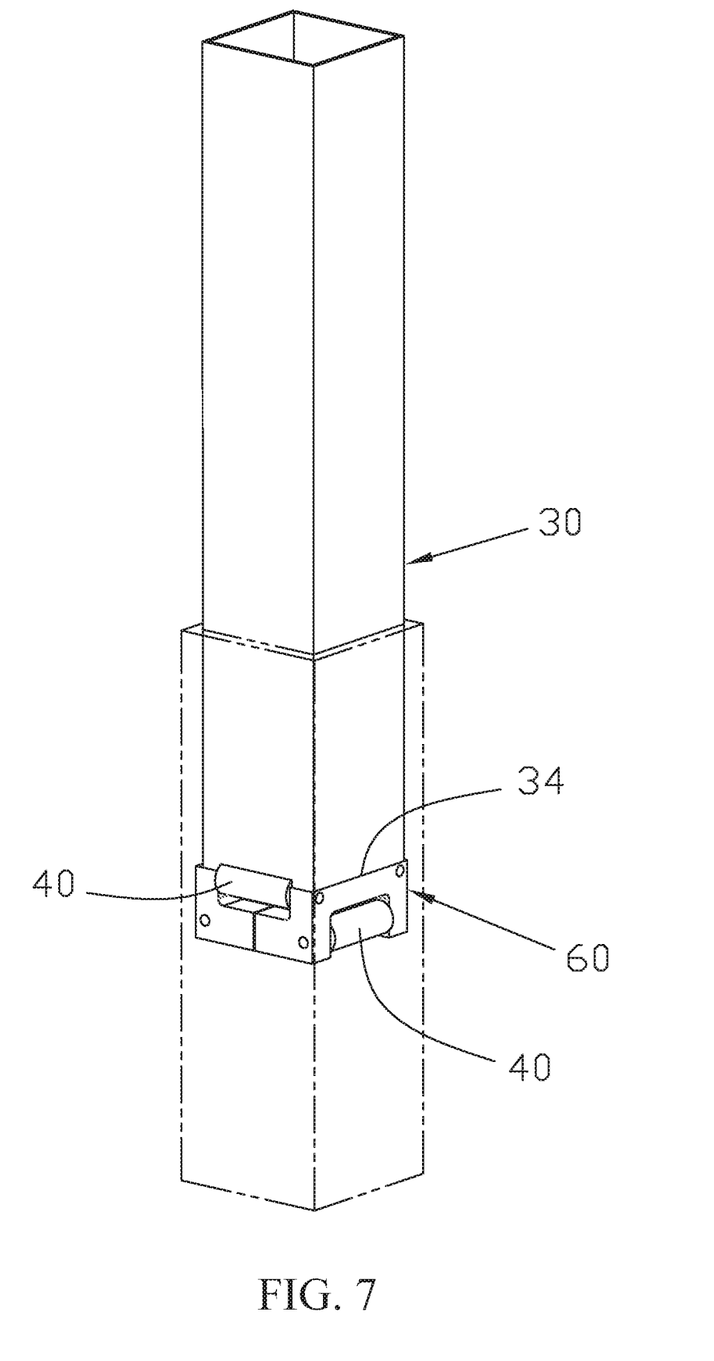
FIG. 7 is a perspective view of a fourth preferred embodiment of the present invention, showing the first leg member be lowered.
Figure 8:
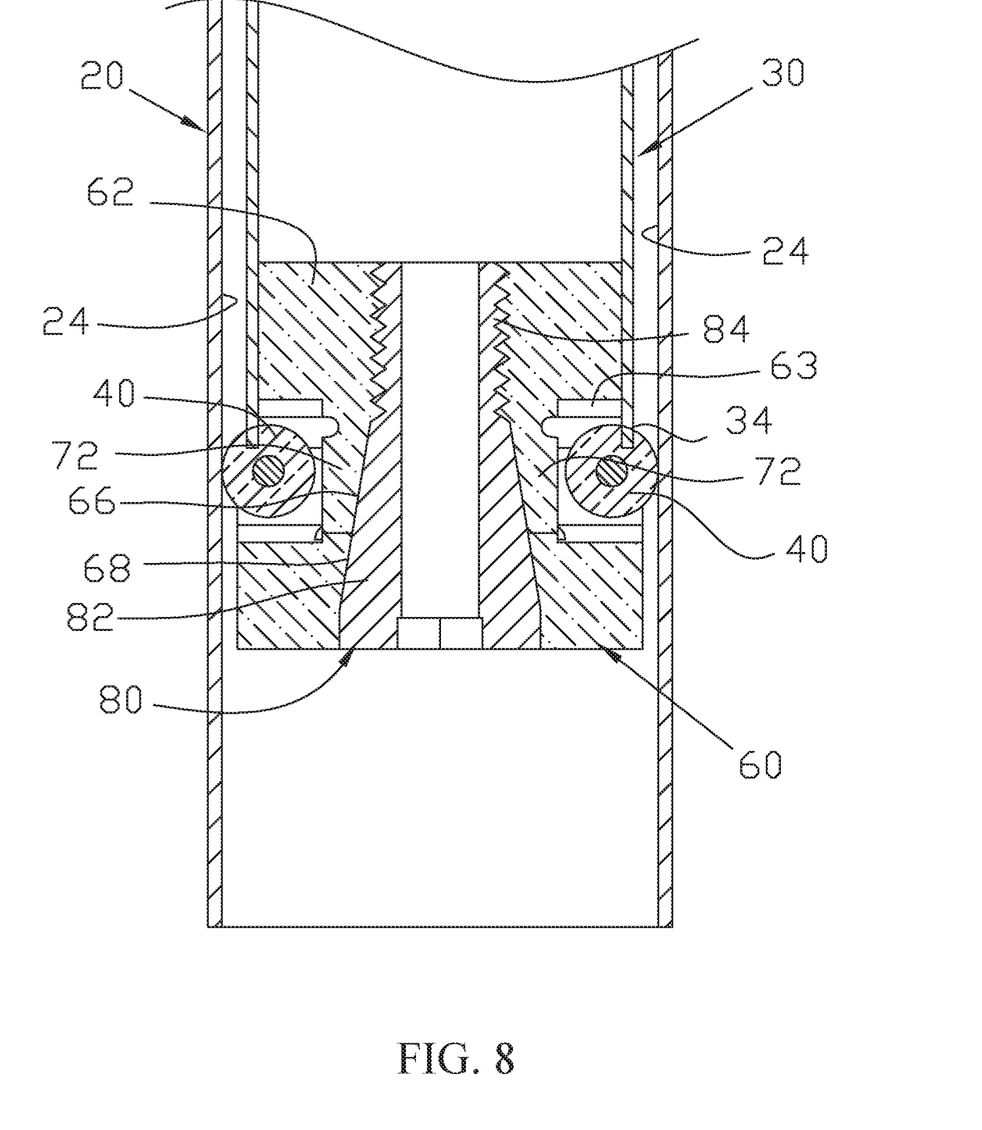
FIG. 8 is a partial sectional view of the fourth preferred embodiment of the present invention.

As shown in FIG. 7 and FIG. 8, a telescopic module of the fourth preferred embodiment of the present invention further provides a hub 60 on an end 34 of the second tube 30, and the rollers 40 are pivoted on the hub 60 to touch the first tube 20.

Figure 9:
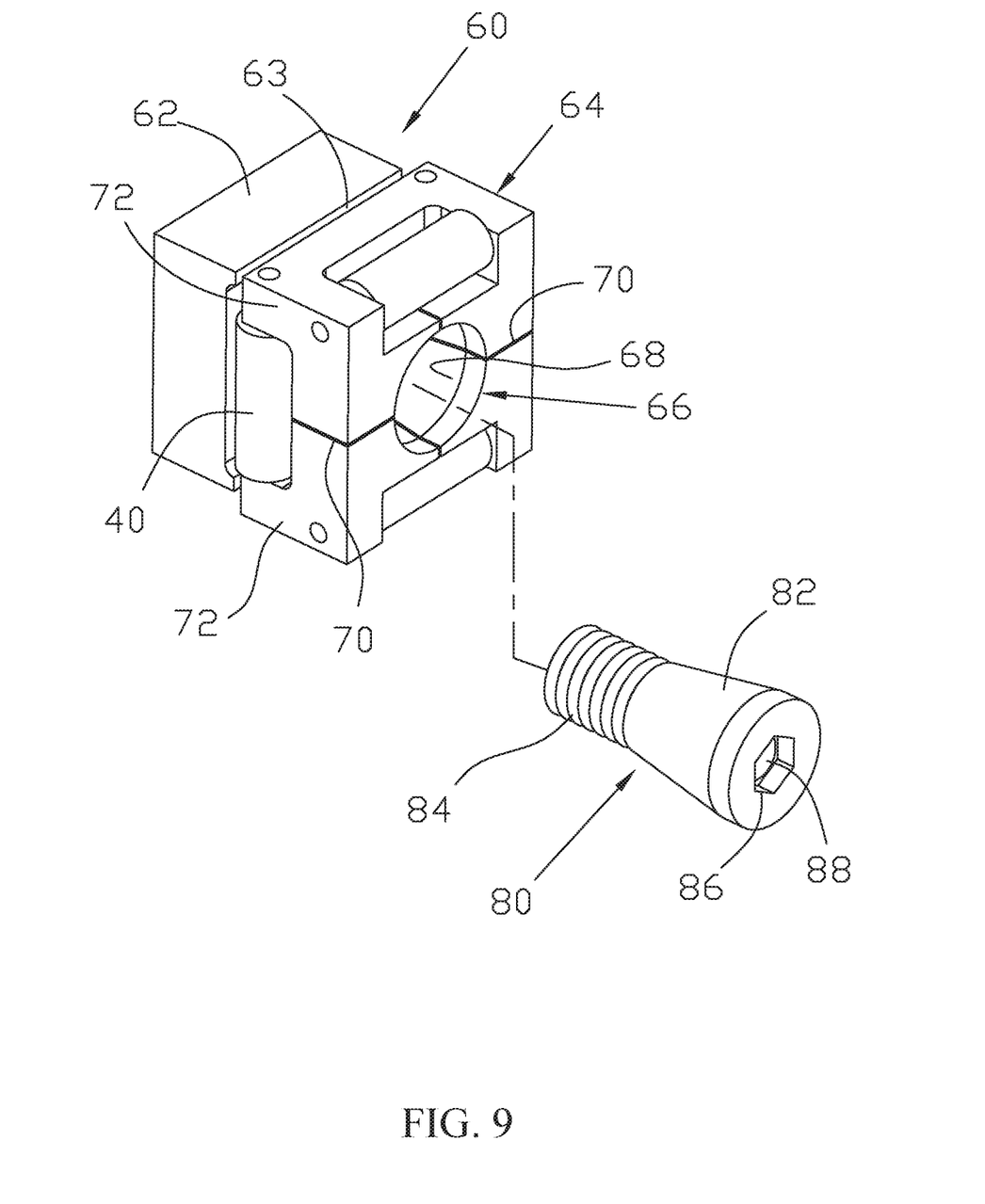
FIG. 9 is a perspective view of the hub and the adjusting member of a preferred embodiment of the present invention.

As shown in FIG. 9, the hub 60 includes an engaging portion 62 and an extending portion 64 connected to the engaging portion 62. A diameter of the engaging portion 62 is smaller than that of the extending portion 64. The hub 60 is provided with a slot 63 between the engaging portion 62 and the extending portion 64.

The hub 60 is provided with an expanding hole 66 extending from the extending portion 64 to the engaging portion 62 and a threaded hole (not shown) at an inner end of the expanding hole 66. A diameter of the expanding hole 66 gradually narrows from the extending portion 64 to the engaging portion 62, so that there is a conical sidewall 68 surrounding the expanding hole 66. The hub 60 further is provided with several gaps 70 to form a plurality of flexible portions 72 between the gaps 70. The rollers 40 each has opposite ends connected to two of the neighboring flexible portions 72.

The telescopic module further includes an adjusting member 80, having a conical head 82 and a threaded section 84. The cone head 82 is complementary to the conical sidewall 68, and is slightly bigger than the conical sidewall 68.

As shown in FIG. 8, the engaging portion 62 of the hub 60 is inserted into the second tube 30, and the extending portion 64 is left out to let the rollers 40 touch the inner side 24 of the first tube 20.

The adjusting member 80 is screwed into the expanding hole 66 with the threaded section 84 engaging the threaded hole and the conical head 82 abutting against the conical sidewall 68 to move the flexible portions 72 outwardly as well as the rollers 40 connected to the flexible portions 72 while the adjusting member 80 is being turned. The deeper the adjusting member 80 is screwed, the further the flexible portions 72 move. As a result, pressures of the rollers 40 against the inner side 24 of the first tube 20 are adjustable by turning the adjusting member 80. Therefore, it may provide the second tube 30 a more stable and smoother movement, and minimum the friction when the second tube 30 is moving by turning the adjusting member 80 even if the telescopic module is operated for a long time.

As shown in FIG. 9, the adjusting member 80 is provided with a connecting portion 86. The connecting portion 86 is a slot configured to connect a driving device (not shown), such as a hand tool and a power tool, for a user easier to turn the adjusting member 80 by operating the driving device.

The adjusting member 80 is provided with a bore 88, which is configured to connect a pneumatic device (not shown) to elevate or lower the telescopic module powered by the pneumatic device.

Figure 10:
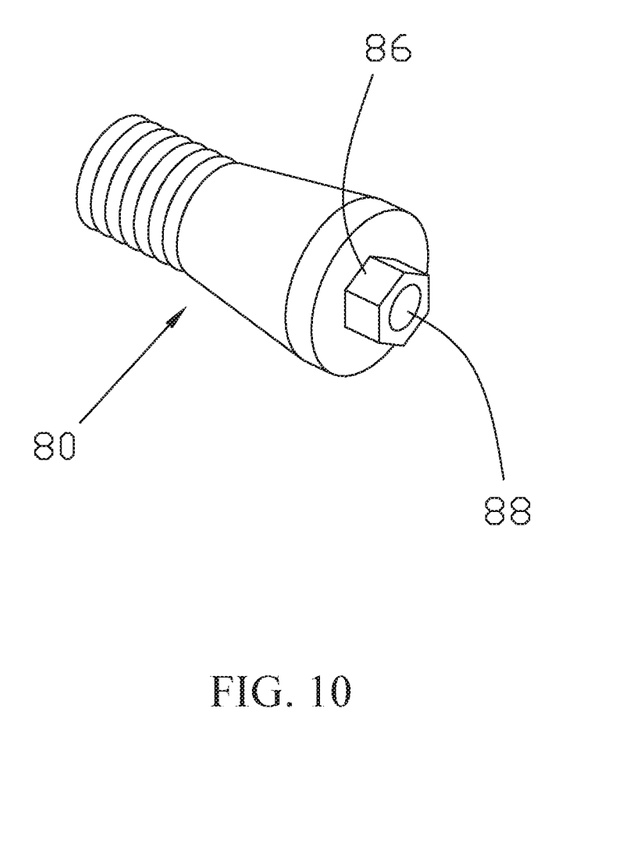
FIG. 10 is a perspective view of another adjusting member of a preferred embodiment of the present invention.

As shown in FIG. 10, the connecting portion 86 is a block projected from the adjusting member 80 configured to connect a barrel of a driving device (not shown), and the block is provided with a bore 88 configured to connect a pneumatic device (not shown). The function of the connecting portion 86 and the bore 88 are the same as above.

Figure 11:
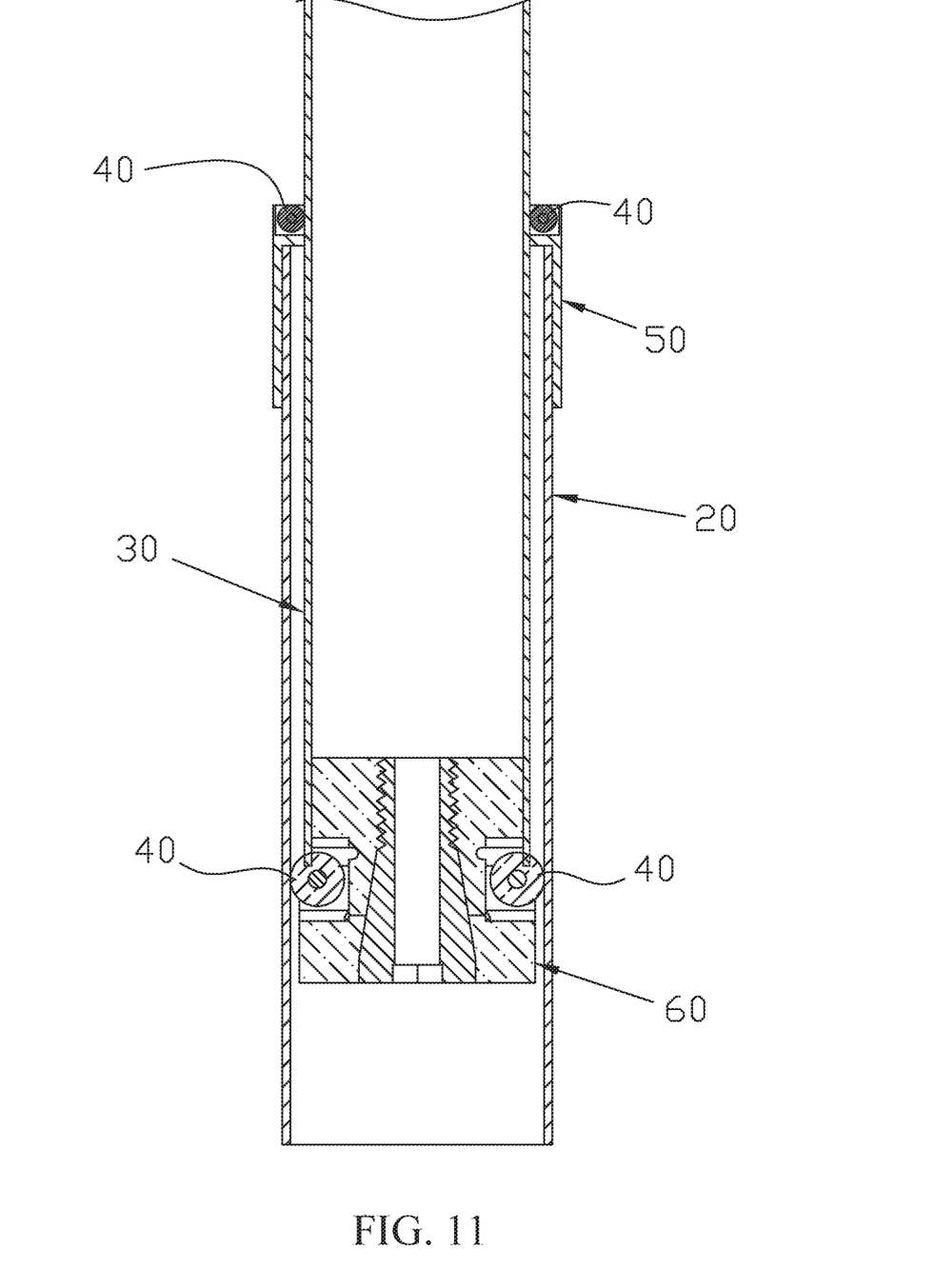
FIG. 11 is a partial sectional view of a fifth preferred embodiment of the present invention.

As shown in FIG. 11, two hubs 50, 60 are provided in the telescopic module of the fifth preferred embodiment of the present invention, one of which 50 is connected to the first tube 20 with rollers 40 against the second tube 30, and the other of which 60 is connected to the second tube 30 with rollers 40 against the first tube 20. It has the same function as above.

Figure 12:
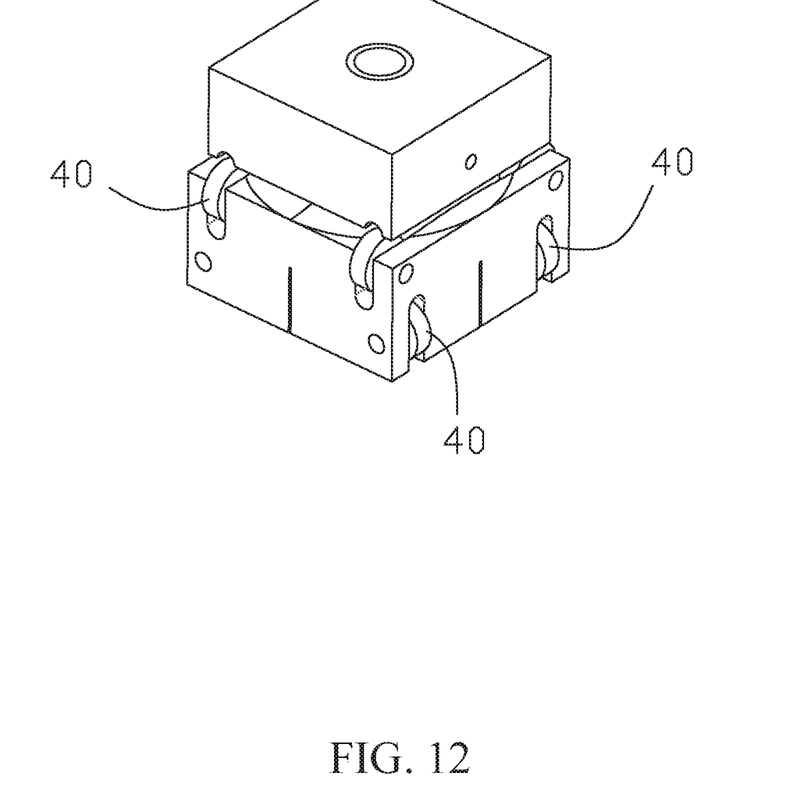
FIG. 12 is a perspective view of the hub and alternate rollers of a preferred embodiment of the present invention.

In the above preferred embodiment, the rollers 40 are cylindrical rollers, and they may be ball rollers as well (FIG. 12).

It must be pointed out that the embodiments described above are only some preferred embodiments of the present invention. All equivalent structures which employ the concepts disclosed in this specification and the appended claims should fall within the scope of the present invention.

What is claimed is:

1. A telescopic module, comprising:
   a first tube having a passageway therein;
   a second tube received in the passageway of the first tube for reciprocation;
   a roller between the first tube and the second tube for free turning, wherein the roller touches at least one of an inner side of the first tube and an outer side of the second tube to be turned when the second tube is moving;
   a hub, on which the roller is pivoted, wherein the hub is connected to the second tube to have the roller touching the inner side of the first tube;
   wherein the hub is provided with an expanding hole and at least a flexible portion; the roller is pivoted on the flexible portion; and
   an adjusting member inserted into the expanding hole and abutting against the flexible portion to move the roller outwardly.

2. The telescopic module of claim 1, wherein the expanding hole has a conical sidewall, and the adjusting member has a conical head abutting against the conical sidewall to move the flexible portion and the roller outwardly when the adjusting member is inserted into the expanding hole of the hub.

3. The telescopic module of claim 1, wherein the adjusting member is provided with a connecting portion configured to connect a driving device to drive the adjusting member into the expanding hole of the hub.

4. The telescopic module of claim 3, wherein the connecting portion of the adjusting member is a slot or a block.

5. The telescopic module of claim 1, wherein the hub has an engaging portion and an extending portion connected to the engaging portion; the extending portion is bigger than the engaging portion; the engaging portion is received in the second tube while the extending portion is left out; the roller is pivoted on the extending portion to touch the inner side of the first tube.

6. The telescopic module of claim 5, wherein the extending portion of the hub is provided with a plurality of gaps to form a plurality of flexible portions therebetween, and opposite ends of the roller are connected to two of the flexible portions respectively.

7. The telescopic module of claim 5, wherein the hub is provided with a slot between the engaging portion and the extending portion.

* * * * *